2,728,637
Patented Dec. 27, 1955

2,728,637

TERNARY ALKALINE EARTH METAL SULFIDES OF TITANIUM AND THEIR PREPARATION

Witty Lysle Alderson, Jr., and John T. Maynard, Wilmington, Del., assignors to E. I. du Pont de Nemours & Company, Wilmington, Del., a corporation of Delaware No Drawing. Application July 27, 1953,
Serial No. 370,649

10 Claims. (Cl. 23—134)

This invention relates to new metal sulfides and to methods for their preparation. More particularly, this invention relates to new ternary metal sulfides and methods for their preparation.

Ternary oxides of silicon and group IV metals with alkaline earth metals are known and have found use in various applications. However, no ternary sulfide of titanium, with an alkaline earth metal has heretofore been known.

It is an object of this invention to provide new ternary metal sulfides and methods for their preparation. A further object is to provide new ternary metal sulfides which are useful as pigments and opacifiers in ceramic glazes, enamels, and glasses. Other objects will appear hereinafter.

These and other objects of this invention are accomplished by providing new ternary metal sulfides in which the sulfur is combined with titanium and with an alkaline earth metal. In these new ternary metal sulfides, the sulfur is chemically combined with an alkaline earth metal and with titanium.

These new ternary metal sulfides are conveniently prepared by sintering a binary sulfide of titanium with a binary sulfide of an alkaline earth metal in an inert atmosphere, e. g., nitrogen or helium. Thus, the ternary metal sulfides of this invention can be prepared by bringing an inert gas, such as helium, in contact with a 1:1 mole mixture of an alkaline earth metal sulfide and a sulfide of titanium heated to between 800° and 1400° C. In place of using the preformed sulfides, the sulfides can be made in situ by passing hydrogen sulfide over a mixture of oxides or hydroxides of titanium and oxides or hydroxides of an alkaline earth metal, heated to a temperature of at least 500° C. until evolution of sulfur and water has ceased. Thereafter the hydrogen sulfide may be replaced by a stream of inert gas, e. g., helium or nitrogen, and the temperature raised to between 800° and 1400° C., where it is maintained for from 10 minutes to 6 hours.

The X-ray diffraction data given in the examples were obtained by the Debye-Scherrer powder method with a North American Phillips unit, using copper K alpha-radiation filtered through nickel to give an effective wave length of 1.542 A. units. In this method, the sample is finely ground and packed into a capillary tube, which is mounted in a camera having a 114.9 mm. diameter.

In the tabulations in the examples of the diffraction data, the heading "I" refers to the observed intensity values and "d" to the interplanar spacings expressed in angstrom (A.) units. The letter "S" designates the strongest line recorded; $M_1$, $M_2$, $M_3$, and $M_4$ are lines of medium intensity, the order of intensity decreasing with increasing numerical sequence; F means that the line is faint, and V that it is very weak. Reactant proportions ar expressed as parts by weight.

EXAMPLE I

An intimate mixture of 2.24 parts of titanium disulfide with 3.38 parts of barium sulfide is heated in a stream of hydrogen sulfide for three hours at 1000° C. The X-ray diffraction pattern of the resulting barium titanium sulfide reaction product is tabulated below. After subtraction of the pattern for some residual barium and titanium sulfide and for titanium dioxide, the remaining pattern finds no counterpart in the A. S. T. M. (American Society for Testing Materials) file of known X-ray diffraction data.

*X-ray diffraction data on barium titanium sulfide reaction product*

| I | d | I | d | I | d |
|---|---|---|---|---|---|
| S | 2.92 | F | 1.95 | F | 1.24 |
| $M_2$ | 5.69 | $M_4$ | 1.92 | F | 1.23 |
| $M_2$ | 4.08 | F | 1.90 | V | 1.20 |
| $M_2$ | 3.68 | F | 1.87 | V | 1.19 |
| $M_3$ | 3.61 | Band F | 1.85 | V | 1.17 |
| $M_4$ | 3.51 | Band F | 1.80 | F | 1.16 |
| $M_3$ | 3.36 | V | 1.75 | V | 1.13 |
| $M_1$ | 3.23 | $M_3$ | 1.70 | Broad $M_2$ | 1.10 |
| $M_1$ | 3.18 | $M_1$ | 1.68 | | |
| V | 3.09 | V | 1.66 | $M_3$ | 1.05 |
| F | 2.98 | V | 1.64 | F | 1.01 |
| $M_4$ | 2.84 | F | 1.63 | $M_3$ | 0.986 |
| $M_1$ | 2.67 | $M_4$ | 1.60 | $M_4$ | 0.965 |
| $M_1$ | 2.61 | $M_4$ | 1.56 | F | 0.904 |
| $M_2$ | 2.49 | V | 1.53 | | |
| F | 2.42 | Band V | 1.51 | $M_3$ | 0.893 |
| $M_4$ | 2.34 | Band V | 1.48 | $M_3$ | 0.879 |
| $M_1$ | 2.26 | V | 1.47 | $M_3$ | 0.877 |
| $M_3$ | 2.23 | $M_4$ | 1.45 | | |
| $M_3$ | 2.19 | $M_3$ | 1.43 | $M_3$ | 0.846 |
| $M_3$ | 2.11 | $M_3$ | 1.36 | $M_2$ | 0.831 |
| $M_3$ | 2.06 | Broad $M_3$ | 1.35 | $M_2$ | 0.822 |
| $M_4$ | 2.03 | $M_4$ | 1.30 | | |
| F | 1.99 | F | 1.28 | | |

EXAMPLE II

A mixture like that of Example I is similarly heated to 1000° C. in an atmosphere of hydrogen sulfide for two hours and then heated further to 1200° C. in an atmosphere of helium for two hours. The X-ray diffraction of the resulting barium titanium sulfide reaction product obtained finds no counterpart in the ASTM file of known diffraction data.

*X-ray diffraction data on barium titanium sulfide reaction product*

| I | d | I | d | I | d |
|---|---|---|---|---|---|
| S | 2.60 | $M_4$ | 1.96 | V | 1.41 |
| $M_1$ | 4.09 | F | 1.84 | Broad F | 1.30 |
| $M_1$ | 3.40 | F | 1.79 | F | 1.28 |
| $M_4$ | 2.95 | $M_4$ | 1.74 | V | 1.23 |
| $M_4$ | 2.82 | $M_3$ | 1.70 | V | 1.22 |
| $M_4$ | 2.55 | F | 1.61 | F | 1.07 |
| F | 2.365 | F | 1.58 | V | 1.03 |
| $M_4$ | 2.17 | F | 1.56 | | |
| $M_2$ | 2.065 | $M_4$ | 1.45 | | |
| $M_3$ | 2.03 | F | 1.43 | | |
| | | F | 1.42 | | |

Example III

Four and nineteen hundredths parts of an intimate mixture of equimolar parts of barium sulfide and titanium sulfide is heated in a hydrogen sulfide atmosphere up to 1100° C. over a period of two hours. After 15 minutes at 1100° C., the sample is allowed to cool. The resulting barium titanium sulfide reaction product is a granular brown-black solid. The X-ray powder pattern shows that this product is identical with that of Example II and does not contain unreacted barium sulfide or titanium sulfide. Analysis of the product shows it to contain: barium, 50.87%; titanium, 13.68%; sulfur, 32.05%. Theory for $BaTiS_3$ is: barium, 48.8%; titanium, 17%; and sulfur, 34.2%.

The X-ray diffraction pattern of the material obtained finds no counterpart in the ASTM file of known X-ray diffraction data.

*X-ray diffraction data on barium titanium sulfide reaction product*

| I | d | I | d | I | d |
|---|---|---|---|---|---|
| S | 2.61 | $M_3$ | 1.76 | F | 1.24 |
| $M_2$ | 4.09 | $M_3$ | 1.69 | F | 1.22 |
| $M_1$ | 3.37 | $M_3$ | 1.616 | $M_2$ | 1.168 |
| $M_3$ | 2.91 | F | 1.56 | $M_3$ | 1.104 |
| V | 2.32 | $M_3$ | 1.457 | $M_3$ | 1.085 |
| F | 2.199 | $M_3$ | 1.413 | $M_1$ | 1.033 |
| $M_1$ | 2.06 | V | 1.339 | $M_2$ | 0.974 |
| $M_3$ | 1.94 | $M_2$ | 1.305 | $M_3$ | 0.961 |
| F | 1.84 | $M_3$ | 1.276 | F | 0.949 |

When the above sulfide is ground in linseed oil and the resulting dispersion is painted on a steel panel and baked for two hours at 100° to 150° C. there is obtained a smooth, flexible, tough, black coating.

*Example IV*

An equimolar mixture of strontium sulfide and titanium disulfide is heated to 1100° C. in a stream of hydrogen sulfide over a period of two hours. The temperature is then raised to 1300° C. while helium is passed through the reaction tube. After one hour at this temperature, the resulting strontium titanium sulfide reaction product is a sintered gray-black solid. After subtraction of the X-ray pattern for some residual titanium disulfide, the remaining pattern finds no counterpart in the ASTM file of known X-ray diffraction data.

*X-ray diffraction data on strontium titanium sulfide reaction product*

| I | d | I | d | I | d |
|---|---|---|---|---|---|
| S | 2.51 | $M_2$ | 1.82 | F | 1.35 |
| $M_3$ | 5.80 | V | 1.74 | $M_3$ | 1.29 |
| $M_1$ | 3.85 | V | 1.72 | $M_3$ | 1.26 |
| $M_1$ | 3.35 | $M_1$ | 1.68 | Broad F | 1.21 |
| $M_3$ | 2.90 | V | 1.60 | Broad F | 1.175 |
| V | 2.76 | F | 1.565 | $M_3$ | 1.152 |
| $M_2$ | 2.60 | V | 1.54 | F | 1.11 |
| $M_1$ | 2.35 | V | 1.52 | F | 1.09 |
| F | 2.28 | $M_4$ | 1.48 | F | 1.065 |
| F | 2.18 | F | 1.46 | $M_4$ | 1.035 |
| $M_3$ | 2.05 | $M_4$ | 1.42 | F | 0.995 |
| $M_3$ | 2.01 | $M_4$ | 1.40 | $M_3$ | 0.960 |
| $M_2$ | 1.92 | $M_4$ | 1.39 | | |

*Example V*

An equimolar mixture of calcium and titanium sulfide is treated as described in Example VI to give a sintered black crystalline solid. After subtraction of the X-ray pattern for some residual calcium sulfide, the remaining pattern finds no counterpart in the ASTM file of known X-ray diffraction data.

*X-ray diffraction data on calcium titanium sulfide reaction product*

| I | d | I | d | I | d |
|---|---|---|---|---|---|
| S | 2.85 | $M_1$ | 1.71 | V | 1.04 |
| $M_4$ | 5.75 | $M_3$ | 1.64 | $M_3$ | 1.01 |
| V | 5.03 | F | 1.60 | F | 0.987 |
| $M_2$ | 2.62 | $M_4$ | 1.43 | V | 0.982 |
| $M_1$ | 2.34 | $M_4$ | 1.42 | F | 0.965 |
| F | 2.05 | F | 1.38 | $M_4$ | 0.948 |
| $M_1$ | 2.02 | V | 1.31 | $M_4$ | 0.899 |
| V | 1.94 | $M_2$ | 1.27 | $M_4$ | 0.858 |
| V | 1.91 | V | 1.24 | $M_4$ | 0.827 |
| $M_4$ | 1.81 | $M_4$ | 1.16 | V | 0.822 |
| V | 1.78 | $M_4$ | 1.10 | F | 0.803 |
| V | 1.74 | F | 1.07 | $M_4$ | 0.789 |

When a porous ceramic body is fired in contact with this calcium titanium sulfide at 1400° C., there is imparted to the surface of the ceramic body an adherent lustrous, dark bronze, colored coating with a metallic sheen.

The examples illustrate preferred specific embodiments and are not to be construed as delineating the scope of this invention, either as to reactants or reaction conditions.

As previously stated, the ternary sulfides of this invention consist of sulfur chemically combined with an alkaline earth metal and with titanium, the mole ratio of sulfur to alkaline earth metal in the ternary sulfide being in general 2.5 to 3.

In the examples, the ternary sulfides have been made by sintering 1:1 gram mole mixtures of binary sulfides. Alternatively, the ternary sulfides can be made by sintering a 1:1 gram mole binary mixture of oxides or hydroxides of titanium with oxides or hydroxides of an alkaline earth metal in a sulfiding atmosphere, e. g., hydrogen sulfide. In the latter method, it is desirable to effect the sulfidation in two steps, namely, by first sulfiding the binary mixture at a temperature of at least 500° C. until water and sulfur cease to be evolved, then replacing the sulfiding agent with an inert gas, e. g., nitrogen or helium, and completing the reaction at 800° to 1400° C.

The process is carried out at temperatures which are at least 500° C. but not above 1400° C. The lower temperatures are used when mixed oxides are being sulfided. After the sulfidation reaction is complete the sulfiding agent can be replaced by an inert gas, such as helium, nitrogen and the like, and the reaction completed at 800° to 1400° C., preferably at 1000° to 1200° C., for a period of no less than 10 minutes and no more than 6 hours. Hydrogen sulfide can be used in place of the inert gas as shown in some of the examples.

The process is conducted at atmospheric pressure and this has practical advantages in simplifying equipment requirements and reducing costs. The time of reaction depends upon the nature of the reactants, the temperature and concentration of the hydrogen sulfide or inert gas as the case may be.

With mixed oxides, the reaction is carried on until water no longer appears in the discharge gases and with the metal sulfides until sulfur is no longer present in the discharge gases. The sintering reaction is permitted to proceed for no less than 10 minutes and no longer than 6 hours.

The alkaline earth metals used in the preparation of the ternary sulfides of this invention are calcium, strontium, barium, and magnesium. In general, it is preferred to employ the sulfides of the alkaline earth metals and of titanium in preparing the ternary sulfides of this invention. However, alternatively, their oxides or hydroxides can be used, if desired.

Hydrogen sulfide has been used in the examples as the sulfiding agent. In its place there can be used any material which under the conditions of reaction give rise to hydrogen sulfide.

The ternary metal sulfides of this invention are useful as pigments and opacifiers in ceramic glazes, enamels, and glasses.

As many apparently widely different embodiments of this invention may be made without departing from the spirit and scope thereof, it is to be understood that this invention is not limited to the specific embodiments thereof except as defined in the appended claims.

We claim:

1. A ternary metal sulfide in which the sulfur is chemically combined with barium and titanium.

2. A ternary metal sulfide in which the sulfur is chemically combined with strontium and titanium.

3. A ternary metal sulfide in which the sulfur is chemically combined with calcium and titanium.

4. A ternary metal sulfide in which the sulfur is chemically combined with an alkaline earth metal and with titanium.

5. A method for preparing a ternary metal sulfide which comprises heating a mixture of an alkaline earth metal sulfide and titanium sulfide in contact with hydrogen sulfide at a temperature of 1000° to 1200° C. for a period of 10 minutes to 6 hours.

6. A method for preparing a ternary metal sulfide as set forth in claim 5 wherein said alkaline earth metal sulfide and said titanium sulfide are formed in situ by bringing hydrogen sulfide into contact with a mixture of an oxide of said alkaline earth metal and an oxide of titanium at a temperature of at least 500° C.

7. A method for preparing a ternary metal sulfide as set forth in claim 5 wherein said alkaline earth metal sulfide and said titanium sulfide are formed in situ by bringing hydrogen sulfide into contact with a mixture of the hydroxide of said alkaline earth metal and the hydroxide of titanium at a temperature of at least 500° C.

8. A method for preparing barium titanium sulfide which comprises heating a mixture of titanium sulfide and barium sulfide in contact with hydrogen sulfide at a temperature of 800° to 1400° C. for a period of 10 minutes to 6 hours.

9. A method for preparing strontium titanium sulfide which comprises heating a mixture of titanium sulfide and strontium sulfide in contact with hydrogen sulfide at a temperature of 800° to 1400° C. for a period of 10 minutes to 6 hours.

10. A method for preparing calcium titanium sulfide which comprises heating a mixture of titanium sulfide and calcium sulfide in contact with hydrogen sulfide at a temperature of 800° to 1400° C. for a period of 10 minutes to 6 hours.

References Cited in the file of this patent

UNITED STATES PATENTS 2,500,958   O'Brien _____ Mar. 21, 1950

OTHER REFERENCES

Mellor: "Comprehensive Treatise on Inorganic and Theoretical Chemistry" (1925), vol. 6, pages 986 and 987, Longmans, Green and Company, New York, N. Y.